United States Patent
Narayanamurthy et al.

(10) Patent No.: US 12,271,614 B2
(45) Date of Patent: Apr. 8, 2025

(54) AGGREGATE INLINE DEDUPLICATION WITH VOLUME GRANULAR ENCRYPTION

(71) Applicant: NetApp Inc., San Jose, CA (US)

(72) Inventors: Srinivasan Narayanamurthy, Cary, NC (US); Dnyaneshwar Nagorao Pawar, Bangalore (IN); Jagadish Vasudeva, Shimoga (IN); Parag Deshmukh, Bangalore (IN); Siddhartha Nandi, Bangalore (IN)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/324,355

(22) Filed: May 26, 2023

(65) Prior Publication Data
US 2023/0297264 A1    Sep. 21, 2023

Related U.S. Application Data

(63) Continuation of application No. 17/676,342, filed on Feb. 21, 2022, now Pat. No. 11,662,930, which is a
(Continued)

(51) Int. Cl.
*G06F 3/06* (2006.01)
*H04L 9/08* (2006.01)

(52) U.S. Cl.
CPC .......... *G06F 3/0641* (2013.01); *G06F 3/0608* (2013.01); *G06F 3/067* (2013.01); *H04L 9/0838* (2013.01); *H04L 9/0891* (2013.01)

(58) Field of Classification Search
CPC ... G06F 3/0641; G06F 3/0608; H04L 9/0838; H04L 9/0891
(Continued)

(56) References Cited

U.S. PATENT DOCUMENTS

| | | | | |
|---|---|---|---|---|
| 8,904,120 B1 * | 12/2014 | Killamsetti | ............ | G06F 13/28 711/156 |
| 9,740,583 B1 * | 8/2017 | Brandwine | ......... | G06F 21/6218 |

(Continued)

FOREIGN PATENT DOCUMENTS

CN    108038384 A  *  5/2018  ........... G06F 21/604

OTHER PUBLICATIONS

Xu et al., "RefCRE: A Reference Count Based Rewriting Framework for VM Image Restoration," 2017 IEEE 41st Annual Computer Software and Applications Conference (COMPSAC), Turin, Italy, 2017, pp. 473-482, doi: 10.1109/COMPSAC.2017.197. (Year: 2017).*

(Continued)

*Primary Examiner* — Peter C Shaw
(74) *Attorney, Agent, or Firm* — Cooper Legal Group, LLC

(57) ABSTRACT

Techniques are provided for aggregate inline deduplication and volume granularity encryption. For example, data that is exclusive to a volume of a tenant is encrypted using an exclusive encryption key accessible to the tenant. The exclusive encryption key of that tenant is inaccessible to other tenants. Shared data that has been deduplicated and shared between the volume and another volume of a different tenant is encrypted using a shared encryption key of the volume. The shared encryption key is made available to other tenants. In this way, data can be deduplicated across multiple volumes of different tenants of a storage environment, while maintaining security and data privacy at a volume level.

20 Claims, 9 Drawing Sheets

Related U.S. Application Data continuation of application No. 16/354,562, filed on Mar. 15, 2019, now Pat. No. 11,256,433.

(58) Field of Classification Search
USPC .......................................................... 711/173
See application file for complete search history.

(56) References Cited

U.S. PATENT DOCUMENTS

| | | | |
|---|---|---|---|
| 10,013,431 | B2 | 7/2018 | Luthra et al. |
| 10,387,369 | B1* | 8/2019 | Davenport ............ G06F 3/0689 |
| 10,845,994 | B1* | 11/2020 | Usvyatsky ............ G06F 3/0652 |
| 11,256,433 | B2 | 2/2022 | Narayanamurthy et al. |
| 11,662,930 | B2 | 5/2023 | Narayanamurthy et al. |
| 2013/0103945 | A1 | 4/2013 | Cannon et al. |
| 2013/0262805 | A1* | 10/2013 | Zheng .................. G06F 3/0683 711/162 |
| 2014/0289734 | A1* | 9/2014 | Adams .................. G06F 9/4881 718/104 |
| 2016/0077977 | A1 | 3/2016 | Narayanamurthy |
| 2016/0321290 | A1 | 11/2016 | Luthra et al. |
| 2017/0147836 | A1 | 5/2017 | Joscelyne |
| 2018/0034787 | A1 | 2/2018 | Kamaraju et al. |
| 2018/0217878 | A1* | 8/2018 | Loh ........................ G06F 9/526 |
| 2019/0073152 | A1 | 3/2019 | Nagle et al. |
| 2019/0108100 | A1* | 4/2019 | Lyakas .................. G06F 3/0641 |
| 2019/0332299 | A1* | 10/2019 | Armangau .......... G06F 16/1727 |
| 2020/0097180 | A1* | 3/2020 | Hironaka .............. G06F 3/0619 |
| 2020/0142627 | A1* | 5/2020 | Kucherov ............. G06F 3/0652 |

OTHER PUBLICATIONS

Zhang et al., "SecDedup: Secure Encrypted Data Deduplication With Dynamic Ownership Updating," in IEEE Access, vol. 8, pp. 186323-186334, 2020, doi: 10.1109/ACCESS.2020.3023387. (Year: 2020).*

Khan et al., "A Content Fingerprint-Based Cluster-Wide Inline Deduplication for Shared-Nothing Storage Systems," in IEEE Access, vol. 8, pp. 209163-209180, 2020, doi: 10.1109/ACCESS.2020.3039056. (Year: 2020).*

Peng et al., "Allocation of shared data based on mobile user movement," Proceedings Third International Conference on Mobile Data Management MDM 2002, Singapore, 2002, pp. 105-112, doi: 10.1109/MDM.2002.994384. (Year: 2002).*

Peng2 et al., "Shared data allocation in a mobile computing system: exploring local and global optimization," in IEEE Transactions on Parallel and Distributed Systems, vol. 16, No. 4, pp. 374-384, Apr. 2005, doi: 10.1109/TPDS.2005.50. (Year: 2005).*

Nie et al., "Design and Implementation of a Virtualized Storage Fabric for Cloud Server," 2014 9th IEEE International Conference on Networking, Architecture, and Storage, Tianjin, China, 2014, pp. 103-107, doi: 10.1109/NAS.2014.23. (Year: 2014).*

Buck et al., "The storage server as virtual volume manager," [1993] Proceedings Twelfth IEEE Symposium on Mass Storage systems, Monterey, CA, USA, 1993, pp. 79-86, doi: 10.1109/MASS.1993.289774. (Year: 1993).*

Backendal et al., "End-to-End Encrypted Cloud Storage," in IEEE Security & Privacy, vol. 22, No. 2, pp. 69-74, Mar.-Apr. 2024, doi: 10.1109/MSEC.2024.3352788. (Year: 2024).*

Leesakul et al., "Dynamic Data Deduplication in Cloud Storage," 2014 IEEE 8th International Symposium on Service Oriented System Engineering, Oxford, UK, 2014, pp. 320-325, doi: 10.1109/SOSE.2014.46. (Year: 2014).*

Hur J., et al., "Secure Data Deduplication with Dynamic Ownership Management in Cloud Storage," in IEEE Transactions on Knowledge and Data Engineering, 2016, vol. 28(11), pp. 3113-3125.

Li J., et al., "Rekeying for Encrypted Deduplication Storage," 46th Annual IEEE/IFIP International Conference on Dependable Systems and Networks, 2016, pp. 618-629.

Puzio P., et al., "ClouDedup: Secure Deduplication with Encrypted Data for Cloud Storage," IEEE 5th International Conference on Cloud Computing Technology and Science, 2013, pp. 363-370.

Qin C., et al., "The Design and Implementation of a Rekeying-Aware Encrypted Deduplication Storage System," ACM Transactions on Storage, vol. 13 (1), Dec. 2016, pp. 1-28.

Tang X., et al., "Efficient Cross-User Deduplication of Encrypted Data Through Re-Encryption," 17th IEEE International Conference on Trust, Security and Privacy In Computing and Communications, 2018, pp. 897-904.

Yuan H., et al., "Secure Cloud Data Deduplication with Efficient Re-Encryption," in IEEE Transactions on Services Computing, 2022, vol. 15(1), pp. 442-456.

* cited by examiner

US 12,271,614 B2

AGGREGATE INLINE DEDUPLICATION WITH VOLUME GRANULAR ENCRYPTION

RELATED APPLICATION

This application claims priority to and is a continuation of U.S. application Ser. No. 17/676,342, filed on Feb. 21, 2022, now allowed, titled "AGGREGATE INLINE DEDUPLICATION WITH VOLUME GRANULAR ENCRYPTION," which claims priority to and is a continuation of U.S. Pat. No. 11,256,433, filed on Mar. 15, 2019, titled "AGGREGATE INLINE DEDUPLICATION WITH VOLUME GRANULAR ENCRYPTION," which are incorporated herein by reference.

BACKGROUND

Tenants of a storage environment, such as a cloud storage environment or multitenant environment, can connect to the storage environment using tenant devices. The tenants can use the tenant devices to store and access data within the storage environment. The storage environment may isolate data of a tenant from data of other tenants. For example, a first volume may be created for a first tenant. The storage environment may restrict access to the first volume to only the first tenant. A second volume may be created for a second tenant. The storage environment may restrict access to the second volume to only the second tenant. Even though data of multiple tenants may utilize the same resources, the data is isolated so that tenants can only access their own data. In an example, data of each volume is encrypted with an encryption key of a tenant whose data is stored in that volume. Thus, each tenant has their own encryption key used to encrypt volumes within which that tenant's data is stored. These encryption keys are not shared with other tenants. Unfortunately, data cannot be deduplicated across volumes of different tenants because each volume of a tenant is encrypted with an encryption key only accessible to that tenant. This significantly wastes storage resources of the storage environment because data cannot be deduplicated across volumes of different tenants.

DETAILED DESCRIPTION

Figure 1:
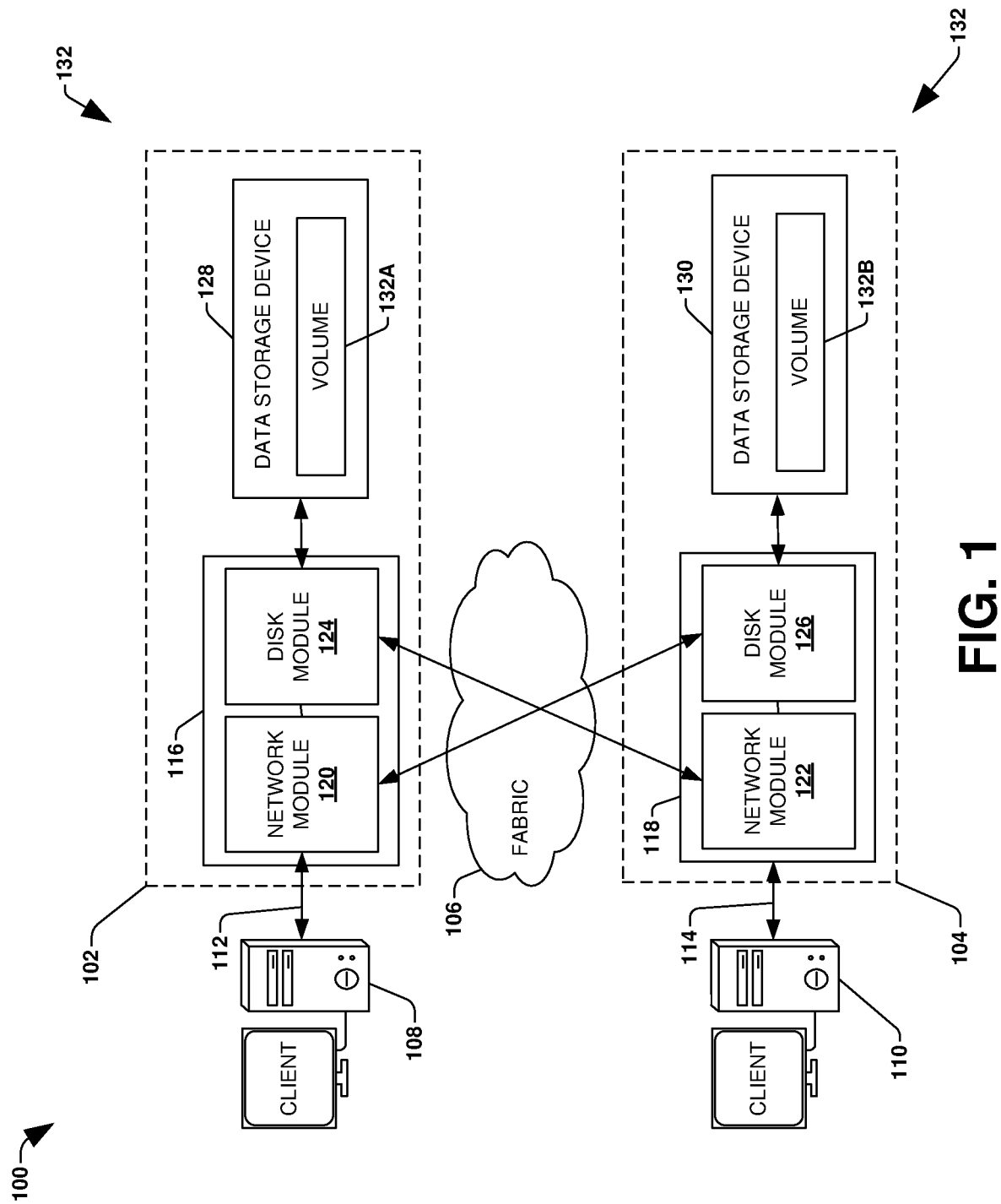
FIG. 1 is a component block diagram illustrating an example clustered network in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A storage environment, such as a cloud computing environment or multi-tenant environment, provides tenants with access to computing and storage resources. For example, the storage environment may provide a tenant with the ability to execute applications, instantiate and run storage virtual servers, store data, etc. The storage environment provides security and privacy by isolating each tenant's data into separate volumes so that a tenant cannot access data of another tenant. In one example, this is accomplished by providing each tenant with their own volume within which the tenant can store and access data. Thus, a first tenant is provided with access to a first volume assigned to the first tenant, but is blocked from accessing volumes assigned to other tenants.

Operation of the storage environment may be improved if the storage environment implements storage efficiency functionality, such as compression and deduplication. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. In this way, inline deduplication is able to deduplicate data before the data is written to disk. This improves the storage efficiency of the storage device.

Operation of the storage environment would also be improved if security and data encryption is used to provide a level of security expected by tenants. For example, data of a tenant may be stored within a volume. The data may be encrypted with a key of the tenant that is not shared with other tenants. Thus, only that tenant can access the tenant's data within the volume. In this way, volume level encryption may be implemented.

Unfortunately, when volume level encryption is used, there is no way to perform deduplication across volumes. Deduplication can only be performed within a volume. This is because each volume has its own exclusive encryption key that is only accessible to a tenant owning that volume. The inability to perform deduplication across volumes significantly reduces the storage benefits of deduplication and operation of the storage environment.

Accordingly, as provided herein, aggregate inline deduplication with volume granular encryption is implemented for the storage environment. Aggregate inline deduplication is performed at an aggregate level that can include deduplicating data across multiple volumes owned by different tenants. This is because the volume granular encryption uses a shared encryption key and an exclusive encryption key per volume for encrypting data. The exclusive encryption key is used to encrypt data of a volume that is exclusive to that volume (e.g., data not comprised within other volumes). The exclusive encryption key is only accessible to the tenant owning that volume. The shared encryption key is used to encrypt data shared between the volume and other volumes. Other volumes of other tenants (e.g., storage services of the storage environment used to provide other tenants with access to data) are able to access and use the shared encryption key to access the shared data. Thus, if shared data is stored within the volume of the tenant and is referenced due to inline deduplication by a second volume of a second tenant, then the shared data is accessible to the second tenant by using the shared encryption key. Thus, when the second tenant requests a file comprising the shared data, a storage service of the storage environment can use the shared encryption key to decrypt the shared data within the volume of the tenant in order to make the file accessible to the second tenant.

To provide for aggregate inline deduplication with volume granular encryption, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, In an embodiment a clustered network can be distributed over a plurality of storage systems and/or nodes located in a plurality of geographic locations; while In an embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In an embodiment, the host devices 108, 110 can exchange information with the network modules 120, 122 residing in the nodes 116, 118 (e.g., network hosts) in the data storage systems 102, 104.

In an embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In an embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that aggregate inline deduplication with volume granular encryption may be implemented within the clustered network environment 100. It may be appreciated that aggregate inline deduplication with volume granular encryption may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
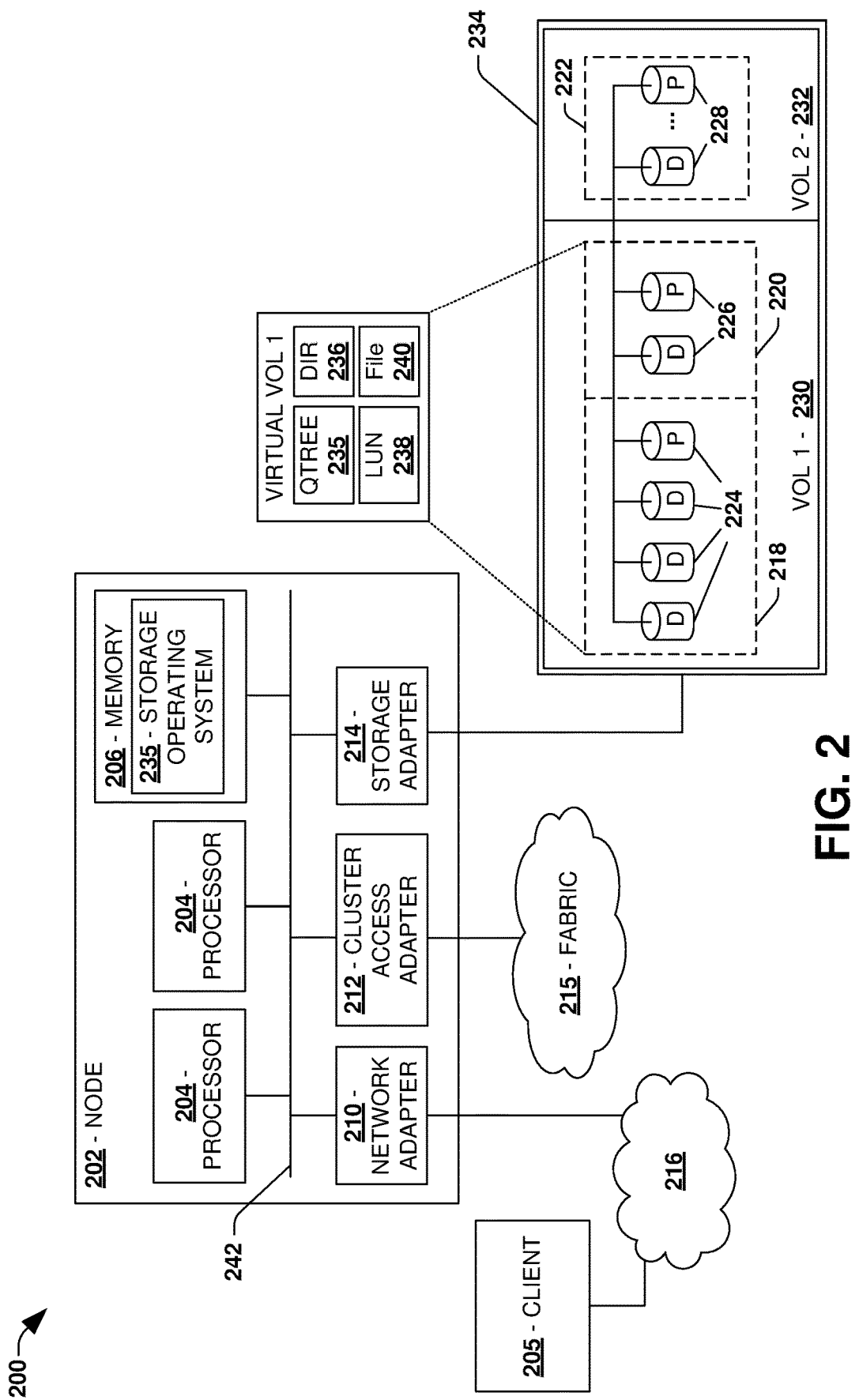
FIG. 2 is a component block diagram illustrating an example data storage system in which an embodiment of the invention may be implemented.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In an embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In an embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In an embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In an embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that aggregate inline deduplication with volume granular encryption may be implemented for the data storage system 200. It may be appreciated that managing objects within an object store may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
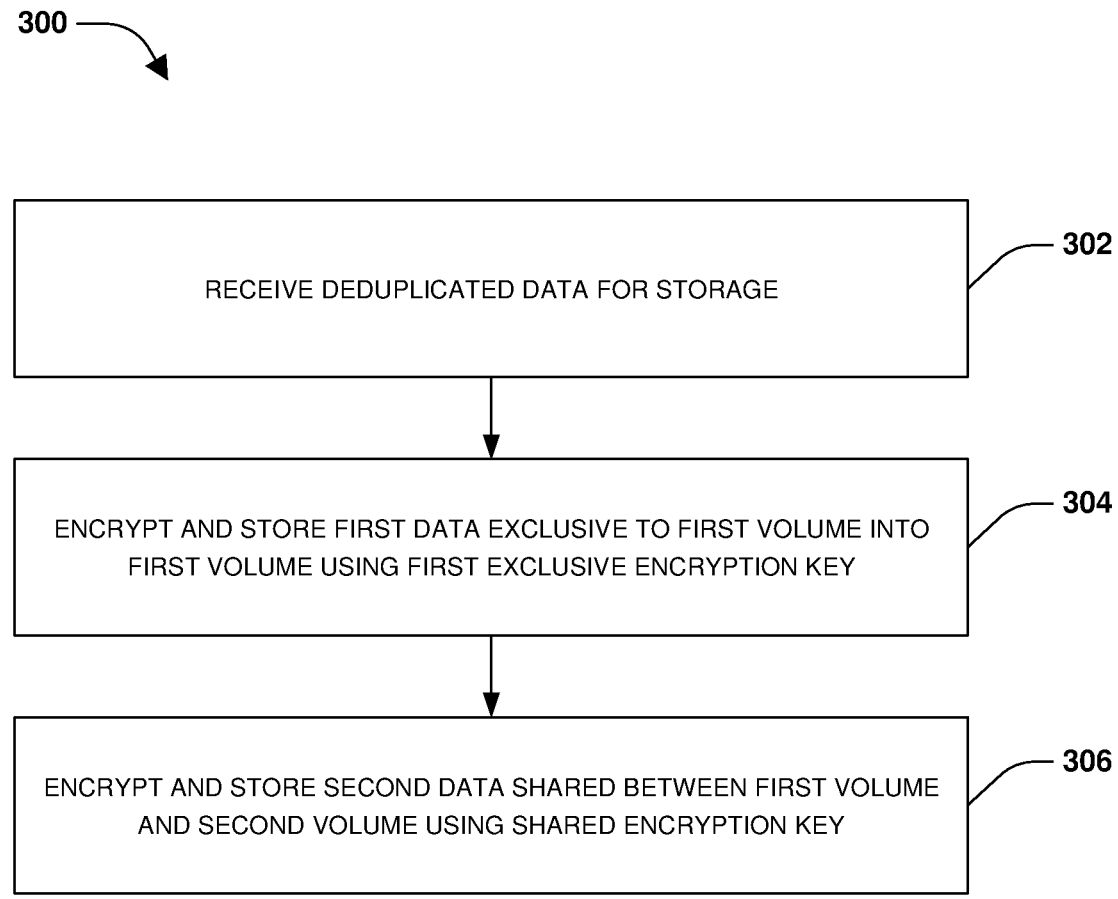
FIG. 3 is a flow chart illustrating an example method for aggregate inline deduplication with volume granular encryption.

One embodiment of aggregate inline deduplication with volume granular encryption is illustrated by an exemplary method 300 of FIG. 3 and further described in conjunction with system 400 of FIGS. 4A-4D. A storage environment 406 provides tenants with access to services and computing resources, such as for application execution and hosting, storage services, etc. For example, a first tenant may connect to the storage environment 406 using a first tenant device 402 (e.g., a laptop, a computer, a wearable device, a mobile device, etc.). The storage environment 406 may assign a first volume 408 to the first tenant for storing data of the first tenant. A second tenant may connect to the storage environment 406 using a second tenant device 404. The storage environment 406 may assign a second volume 410 to the second tenant for storing data of the second tenant. In this way, the storage environment 406 can isolate data of tenants by using different volumes assigned to particular tenants.

In order to provide data security and privacy, data is encrypted using exclusive encryption keys and shared encryption keys that are assigned per volume/per tenant. For example, a first exclusive encryption key is assigned to the first volume 408 for encrypting data exclusive to the first volume 408 (e.g., data that is not shared with another volume). Only the first tenant is provided with access to the first exclusive key (e.g., only storage services provided by the storage environment 406 for the first tenant are able to access the first exclusive key for providing the first tenant with access to the exclusive data within the first volume 408). A first shared encryption key is assigned to the first volume 408 for encrypting data shared between the first volume 408 and one or more additional volumes of the storage environment 406, such as the second volume 410. The first shared encryption key is made available to tenants of the storage environment 406, such as storage services of the storage environment 406 providing the second tenant with access to data within the second volume 410. As will be subsequently discussed in further detail, shared data within the first volume 408 may be referenced by the second volume 410 due to inline deduplication 416, and thus the first shared encryption key of the first volume 408 can be used by the second volume 410 to access the shared data. In this way, data exclusive to the first volume 408 is encrypted and stored within the first volume 408 using the first exclusive encryption key. Data of the first volume 408 that is shared with other volumes is encrypted and stored within the first volume 408 using the first shared encryption key.

A second exclusive encryption key is assigned to the second volume 410 for encrypting data exclusive to the second volume 410 (e.g., data that is not shared with another volume). Only the second tenant is provided with access to the second exclusive key (e.g., only storage services provided by the storage environment 406 for the second tenant are able to access the second exclusive key for providing the second tenant with access to the exclusive data within the second volume 410). A second shared encryption key is assigned to the second volume 410 for encrypting data shared between the second volume 410 and one or more additional volumes of the storage environment 406, such as the first volume 408. The second shared encryption key is made available to tenants of the storage environment 406, such as storage services of the storage environment 406 providing the first tenant with access to data within the first volume 408. As will be subsequently discussed in further detail, shared data within the second volume 410 may be referenced by the first volume 408 due to inline deduplication 416, and thus the second shared encryption key of the second volume 410 can be used by the first volume 408 to access the shared data. In this way, data exclusive to the second volume 410 is encrypted and stored within the second volume 410 using the second exclusive encryption key. Data of the second volume 410 that is shared with other volumes is encrypted and stored within the second volume 410 using the second shared encryption key.

Exclusive encryption keys may be maintained within a tenant server 412 of the storage environment. The tenant server 412 is configured to provide tenants (e.g., a storage service of the storage environment 406 executing on behalf of a particular tenant) with access to their exclusive encryption keys, and to exclude tenants from access exclusive encryption keys of other tenants. For example, the tenant server 412 allows the first tenant to access the first exclusive encryption key but not the second exclusive encryption key of the second tenant. Thus, the first tenant cannot access data within the second volume 410 that is exclusive to the second tenant because the first tenant cannot decrypt the data without the second exclusive encryption key. Similarly, the tenant server 412 allows the second tenant to access the second exclusive encryption key but not the first exclusive encryption key of the first tenant. Thus, the second tenant cannot access data within the first volume 408 that is exclusive to the first tenant because the second tenant cannot decrypt the data without the second exclusive encryption key.

Shared encryption keys may be maintained within an admin server 414 of the storage environment 406. The admin server 414 may be configured to provide tenants (e.g., a storage service of the storage environment 406 executing on behalf of a particular tenant) with access to the shared encryption keys. For example, the first tenant can access the first shared encryption key for decrypting and accessing shared data within the first volume 408 owned by the first tenant. The first tenant can access the second shared encryption key for decrypting and accessing shared data within the second volume 410 owned by the second tenant. The second tenant can access the first shared encryption key for decrypting and accessing shared data within the first volume 408 owned by the first tenant. The second tenant can access the second shared encryption key for decrypting and accessing shared data within the second volume 410 owned by the second tenant.

Because tenants (e.g., a storage service of the storage environment 406 executing on behalf of a particular tenant) have access to shared encryption keys of other tenants, inline deduplication 416 can be performed at an aggregate level across multiple volumes owned by different tenants. Aggregate inline deduplication can be performed to improve storage efficiency of the storage environment 406 while maintaining an acceptable level of data security and privacy because exclusive data cannot be accessed by other tenants due to being encrypted with exclusive encryption keys accessible only to tenants owning such exclusive encryption keys.

Inline deduplication 416 is performed upon data before the data is stored to storage devices, such as before being stored into the first volume 408, the second volume 410, or other volumes. Inline deduplication 416 may receive an incoming operation that is to write data to the first volume 408. Inline deduplication 416 will calculate a fingerprint, such as a hash, of the data to be written by the incoming operation to the first volume 408. Inline deduplication 416 will compare the fingerprint to fingerprints of a fingerprint store 422 comprising fingerprints of data already stored within the storage environment 406. If there is no matching fingerprint within the fingerprint store 422 for data to be written to the first volume 408, then the data is not already stored within the storage environment 406. Thus, the data is encrypted using the first exclusive encryption key and is stored within the first volume 408. If there is a matching fingerprint within the fingerprint store 422 data, then the data is already stored within the storage environment 406. Thus, the data will not be redundantly stored into the first volume 408. Instead, a pointer referencing the already stored data will be stored into the first volume 408. In this way, deduplicated data for storage within the storage environment 406 is received, at 302.

A reference count structure 418 is maintained with mappings between data block identifiers of data blocks within the storage environment 406 and volumes referencing the data block identifiers. If a data block identifier of a data block of data is mapped to (referenced by) more than one volume, then the data is shared data shared between multiple volumes. If the data block identifier is a mapped to only one volume, then the data is exclusive data that is exclusive to just that one volume. In this way, the reference count structure 418 can be used to track and identify shared data and exclusive data.

Figure 4A:
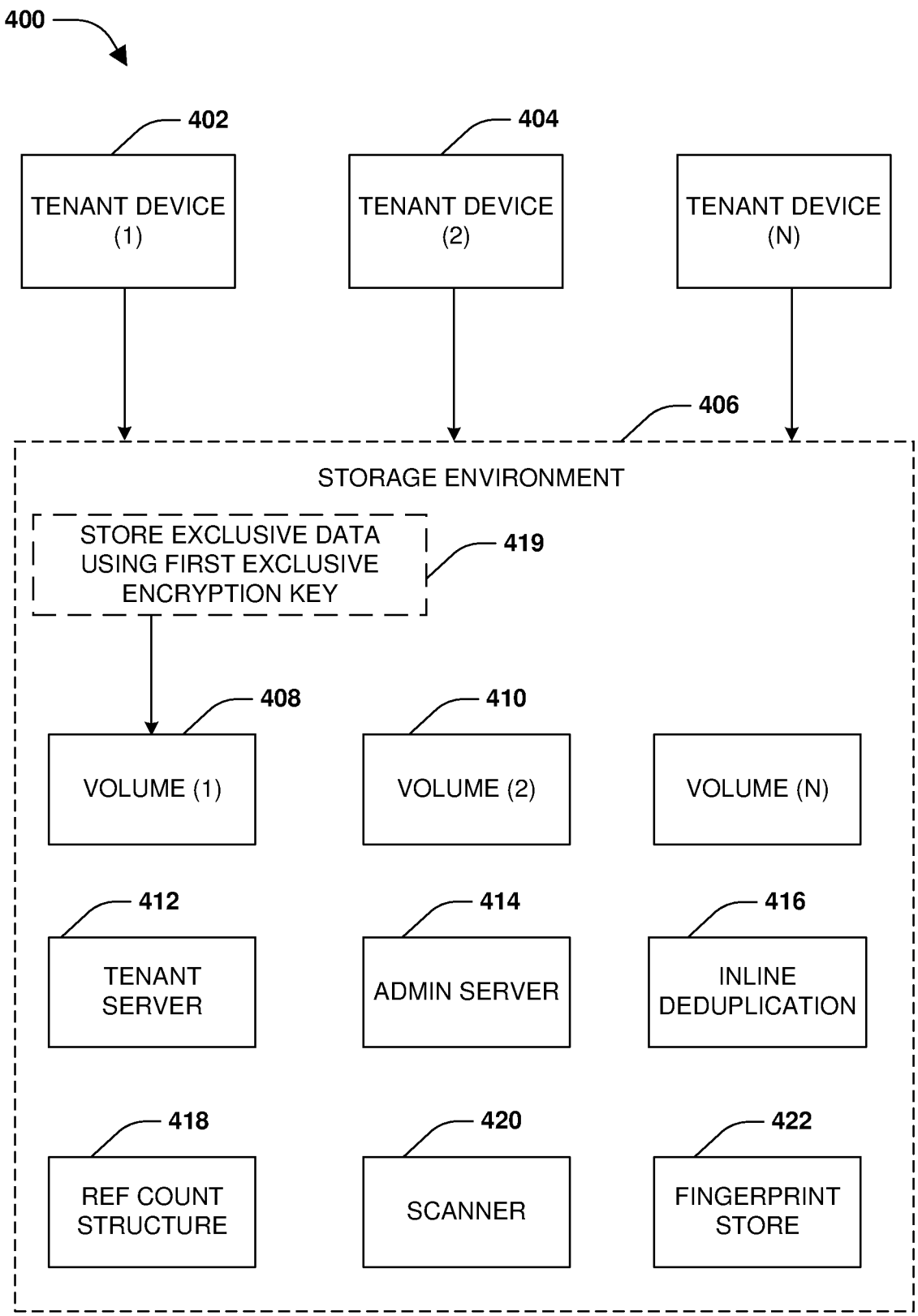
FIG. 4A is a component block diagram illustrating an example system for aggregate inline deduplication with volume granular encryption, where exclusive data is encrypted using an exclusive encryption key.

At 304, data of the deduplicated data that is exclusive to (unique to) the first volume 408 (e.g., data identified by inline deduplication 416 as not already being stored within the storage environment 406) is encrypted and stored 419 into the first volume 408 using the first exclusive encryption key available to the first volume 408 but inaccessible to other volumes/tenants (e.g., inaccessible to storage services executing on behalf of other tenants that are blocked from access the first exclusive encryption key by the tenant server 412), as illustrated by FIG. 4A.

Figure 4B:
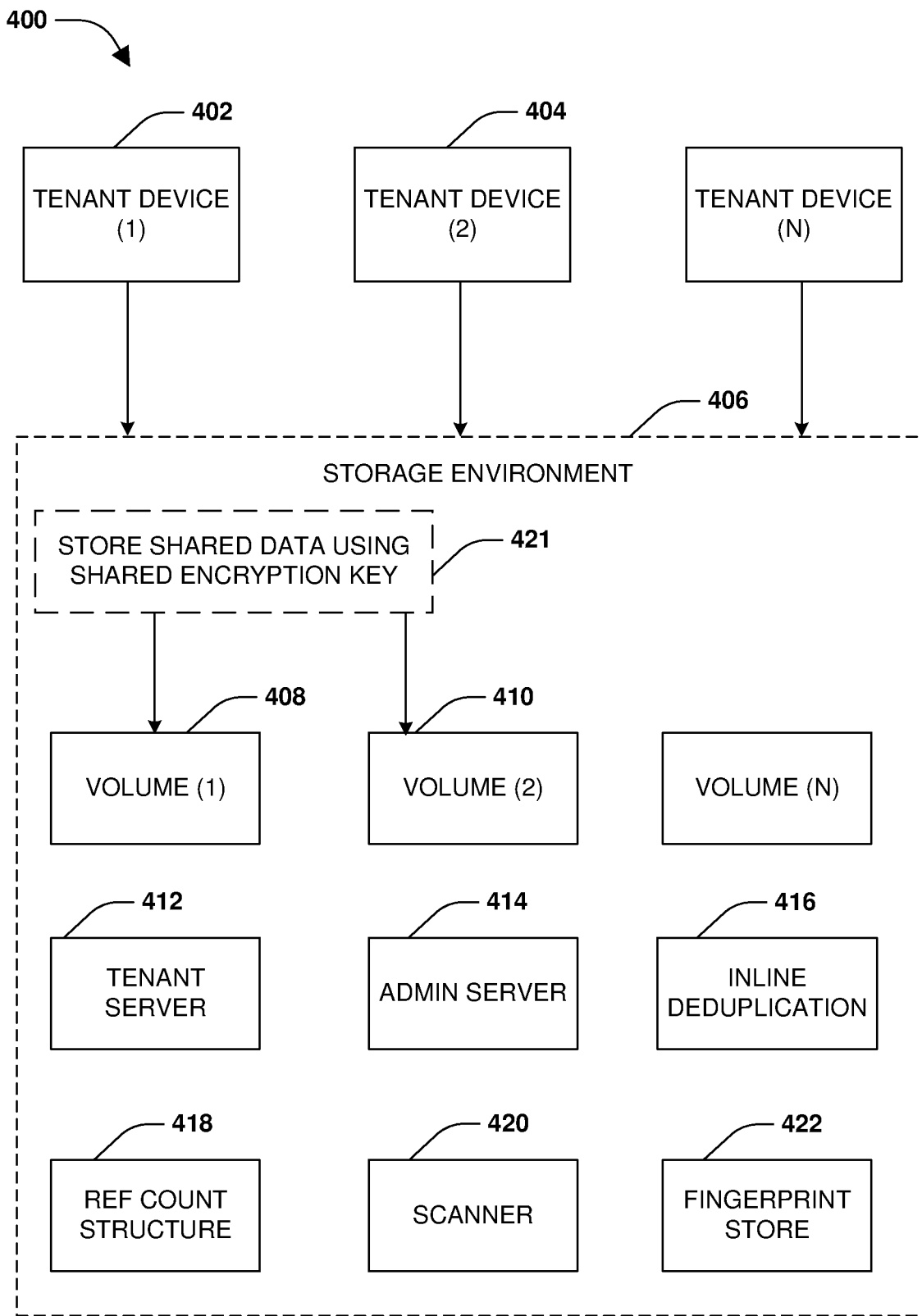
FIG. 4B is a component block diagram illustrating an example system for aggregate inline deduplication with volume granular encryption, where shared data is encrypted using a shared encryption key.

At 306, data of the deduplicated data that is not unique to (not exclusive to) the first volume 408 (e.g., data identified by inline deduplication 416 as already being stored within the second volume 410) is encrypted and stored 421 using a shared encryption key available to other volumes/tenants, as illustrated by FIG. 4B. In particular, if the data is already stored within the second volume 410 and is encrypted using the second shared encryption key available to the first volume 408/tenant, then merely a reference to that data is stored within the first volume 408. Thus, the first volume 410 can use the second shared encryption key and the reference to access the data within the second volume 410. However, if that data is encrypted using the second exclusive encryption key available only to the second tenant (e.g., this is the first instance where the data will be shared), then the data is decrypted using the second exclusive encryption key and is re-encrypted using the second shared encryption key available to the first volume 408/tenant. The reference to the re-encrypted data of the second volume 410 is stored into the first volume 408. Thus, the first volume 410 can now use the second shared encryption key and the reference to access the data within the second volume 410. In this way, exclusive data encrypted using an exclusive encryption key will be decrypted and re-encrypted using a shared encryption key based upon the exclusive data now being shared between multiple volumes of different tenants.

Figure 4C:
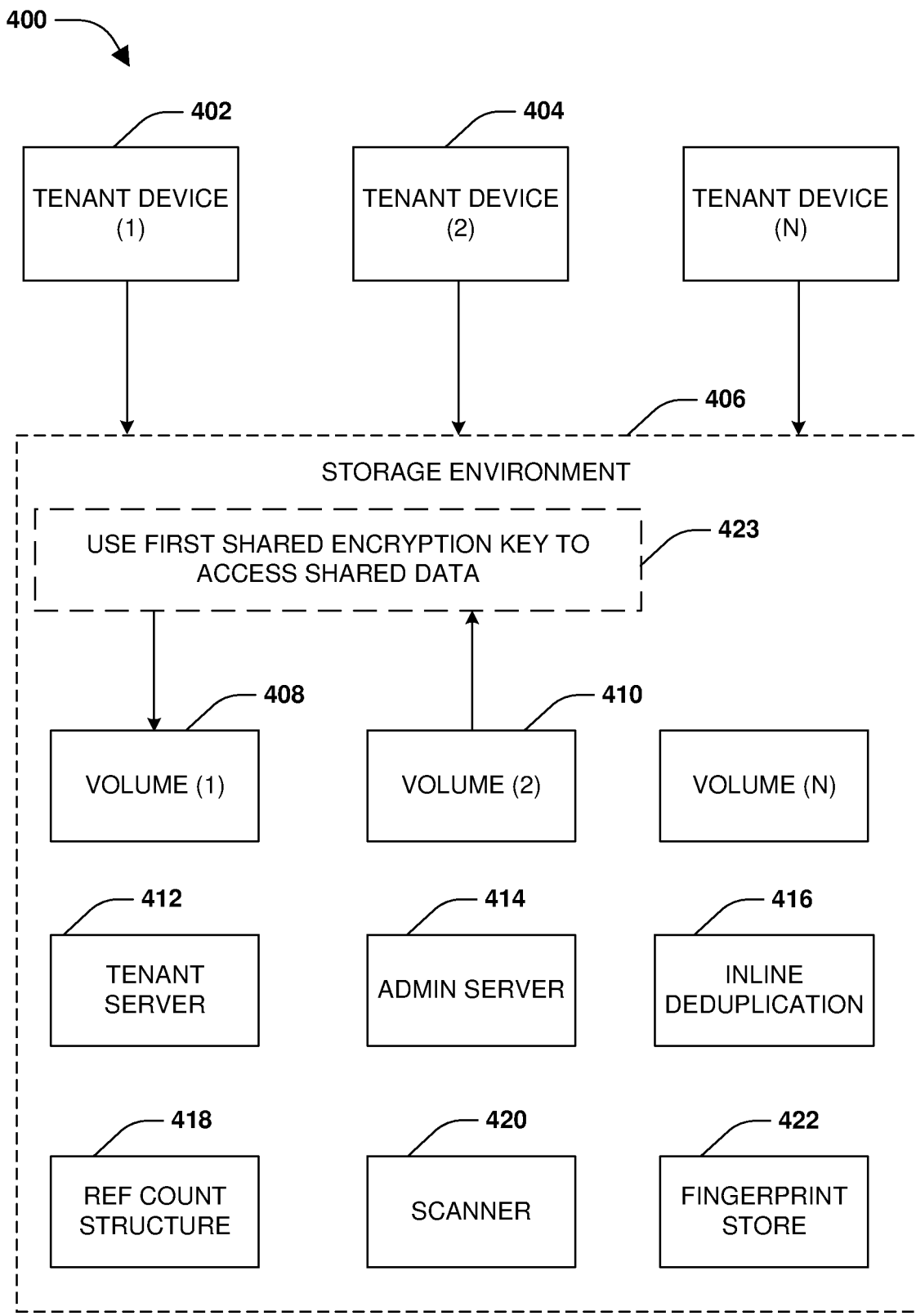
FIG. 4C is a component block diagram illustrating an example system for aggregate inline deduplication with volume granular encryption, where a shared encryption key is used to access shared data.

FIG. 4C illustrates an example of accessing shared data. For example, a first data block within the first volume 408 comprises data that is initially exclusive/unique to the first volume 408, and thus is encrypted with the first exclusive encryption key. An entry is created within the reference count structure 418 with a reference count of 1 mapping a data block identifier of the first data block to the first volume 408. A fingerprint of the data is stored within the fingerprint store 422.

Subsequently, the inline deduplication 416 evaluates an incoming operation using the fingerprint store 422. The incoming operation may be a write operation from the second tenant device 404 to write data into the second volume 410. The inline deduplication 416 may determine that a fingerprint of the data to be written to the second volume 410 matches the fingerprint of the data stored within the first data block of the first volume 408 (e.g., the fingerprint of the data to be written to the second volume 410 is found within the fingerprint store 422). Thus, the data of the incoming operation is duplicate data of the data stored within the first data block of the first volume 408. Accordingly, the first exclusive encryption key of the first volume 408 is used to decrypt the first data block. The first data block is then encrypted using the first shared data block of the first volume 408. As part of the inline deduplication 416, a pointer referencing the first data block within the first volume 408 is stored into the second volume 410 in place of the duplicate data of the incoming operation. The pointer and the first shared encryption key can be used by the second volume 410 to access 423 the shared data within the first data block of the first volume 408. The reference count structure 418 is updated with a reference count of 2 to map the data block identifier to the first volume 408 and the second volume 410. In this way, aggregate inline deduplication and volume granular encryption are implemented for the storage environment 406.

In an embodiment, keys within the tenant server 412 and/or the admin server 414 can be rekeyed (changed). For example, the first exclusive encryption key of the first volume 408 can be rekeyed to a new exclusive encryption key available only to the first volume 408. In particular, the data unique/exclusive to the first volume 408 is decrypted using the first exclusive encryption key. That data is then encrypted using the new exclusive encryption key. The first exclusive encryption key is then deleted from the tenant server 412 and the new exclusive encryption key is stored into the tenant server 412 for exclusive access by the first tenant. Similarly, the first shared encryption key of the first volume 408 can be rekeyed to a new shared encryption key. In particular, shared data within the first volume 408 is decrypted using the first shared encryption key. The shared data is then encrypted using the new shared encryption key. The first shared encryption key is then deleted from the admin server 414 and the new shared encryption key is stored into the admin server 414 for access by tenants.

Figure 4D:
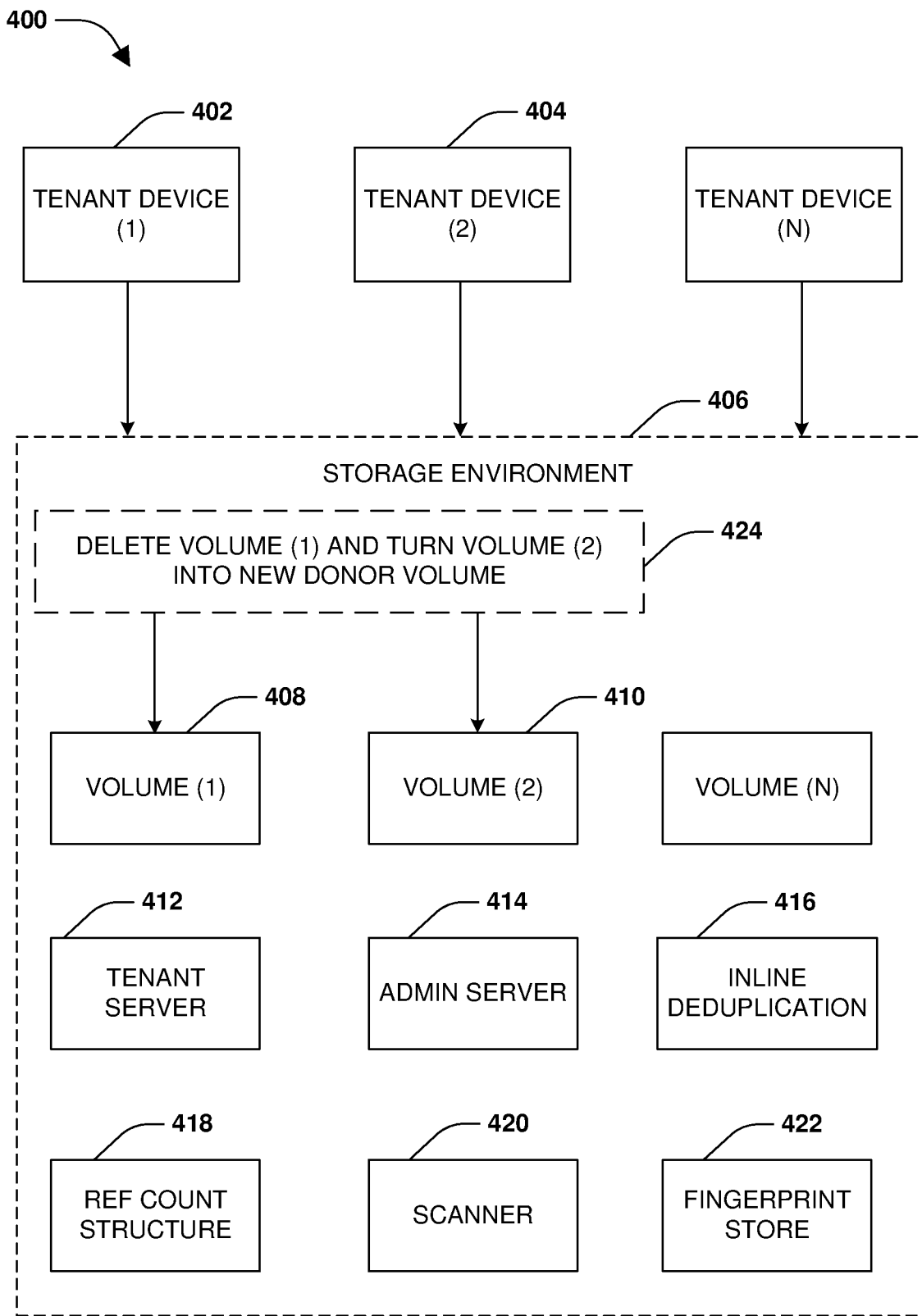
FIG. 4D is a component block diagram illustrating an example system for aggregate inline deduplication with volume granular encryption, where a volume is deleted.

In an embodiment, a volume can be deleted such that a different volume will be used as a donor volume for sharing shared data previously stored by the deleted volume, as illustrated in FIG. 4D. A donor volume is a volume comprising shared data that is referenced by recipient volumes. If the volume comprises shared data then the volume is a donor volume for that particular data, and if the volume references data of other volumes then the volume is a recipient volume for that data. In an example, a delete command is received from the first tenant device 402 to delete the first volume 408 of the first tenant. Accordingly, the first volume 408 is deleted 424 by deleting data exclusive to the first volume 408 (e.g., data not shared by any other volume) and by deleting the first exclusive encryption key of the first volume 408. However, shared data within the first volume 408 and the first shared encryption key of the first volume 408 is not yet deleted, but is designated/marked for subsequent deletion.

References/pointers within the first volume 408 to data within other volumes may be deleted from the first volume 408. The fingerprint store 422 and the reference count structure 418 may be updated to reflect that the first volume 408 has been deleted and no longer comprises exclusive data or references/pointers to shared data within other volumes.

A scanner 420 is executed to identify and reassign the shared data of the deleted first volume 408 to a new donor volume, such as the second volume 410. The scanner 420 may use the reference count structure 418 to identify the shared data based upon data block identifiers having reference counts greater than 1 and thus being referenced by at least one other volume than the first volume 408. The scanner 420 may decrypt the shared data within the deleted first volume 408 using the first shared encryption key of the deleted first volume 408. The shared data may be re-encrypted using the second shared encryption key of the second volume 410, such that the second volume 410 now comprises the shared data. Once complete, the first shared encryption key is deleted. The fingerprint store 422 and the reference count structure 418 may be updated to reflect that the second volume 410 now comprises the shared data and the shared data no longer being stored within the first volume 408. In an embodiment, the scanner 420 may be configured to execute as a background process having lower executing priority than storage services of the storage environment 406 so that the processing of incoming I/O is not impacted by the scanner 420.

Figure 5:
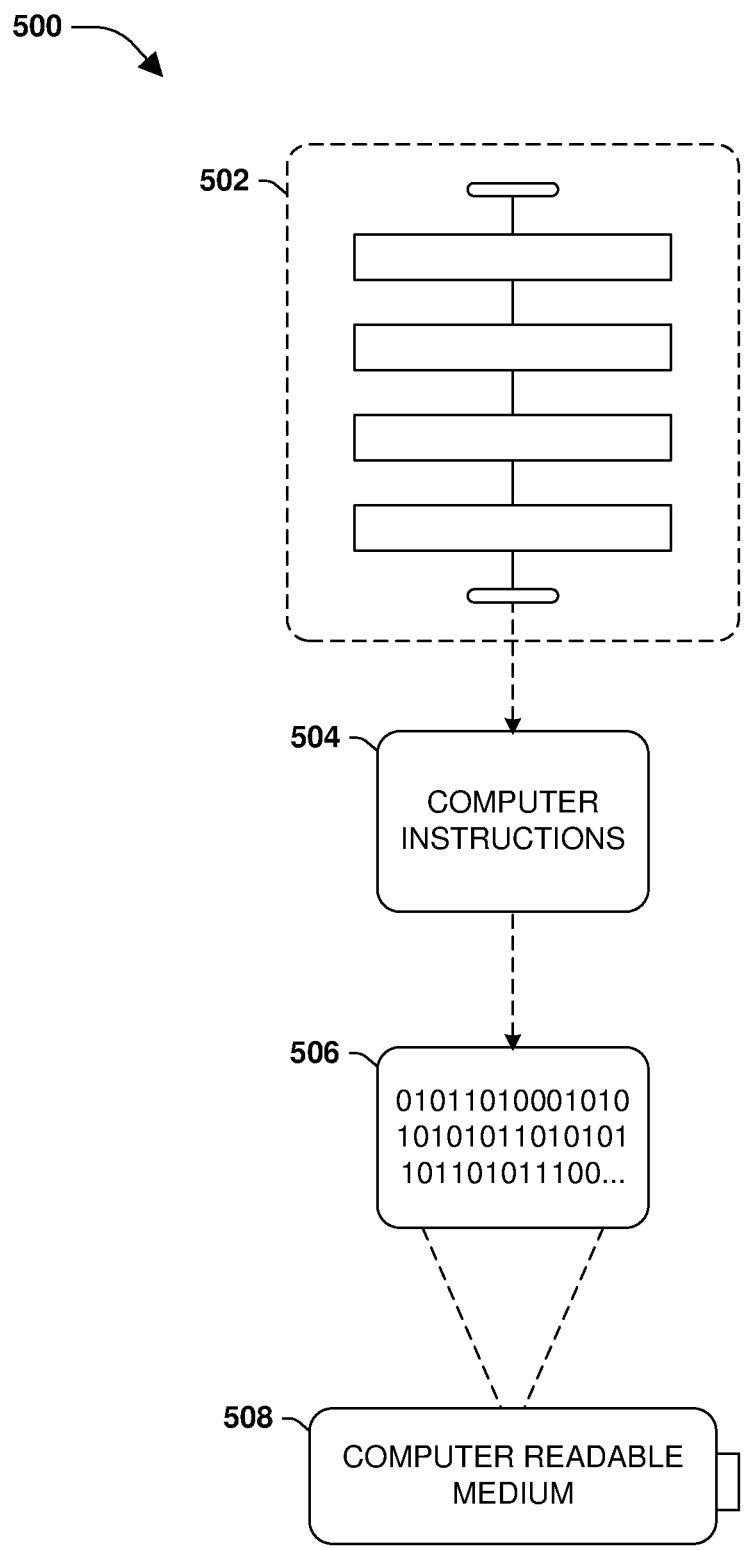
FIG. 5 is an example of a computer readable medium in which an embodiment of the invention may be implemented.

Still another embodiment involves a computer-readable medium 500 comprising processor-executable instructions configured to implement one or more of the techniques presented herein. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4D, for example. Many such computer-readable media are contemplated to operate in accordance with the techniques presented herein.

Figure 6:
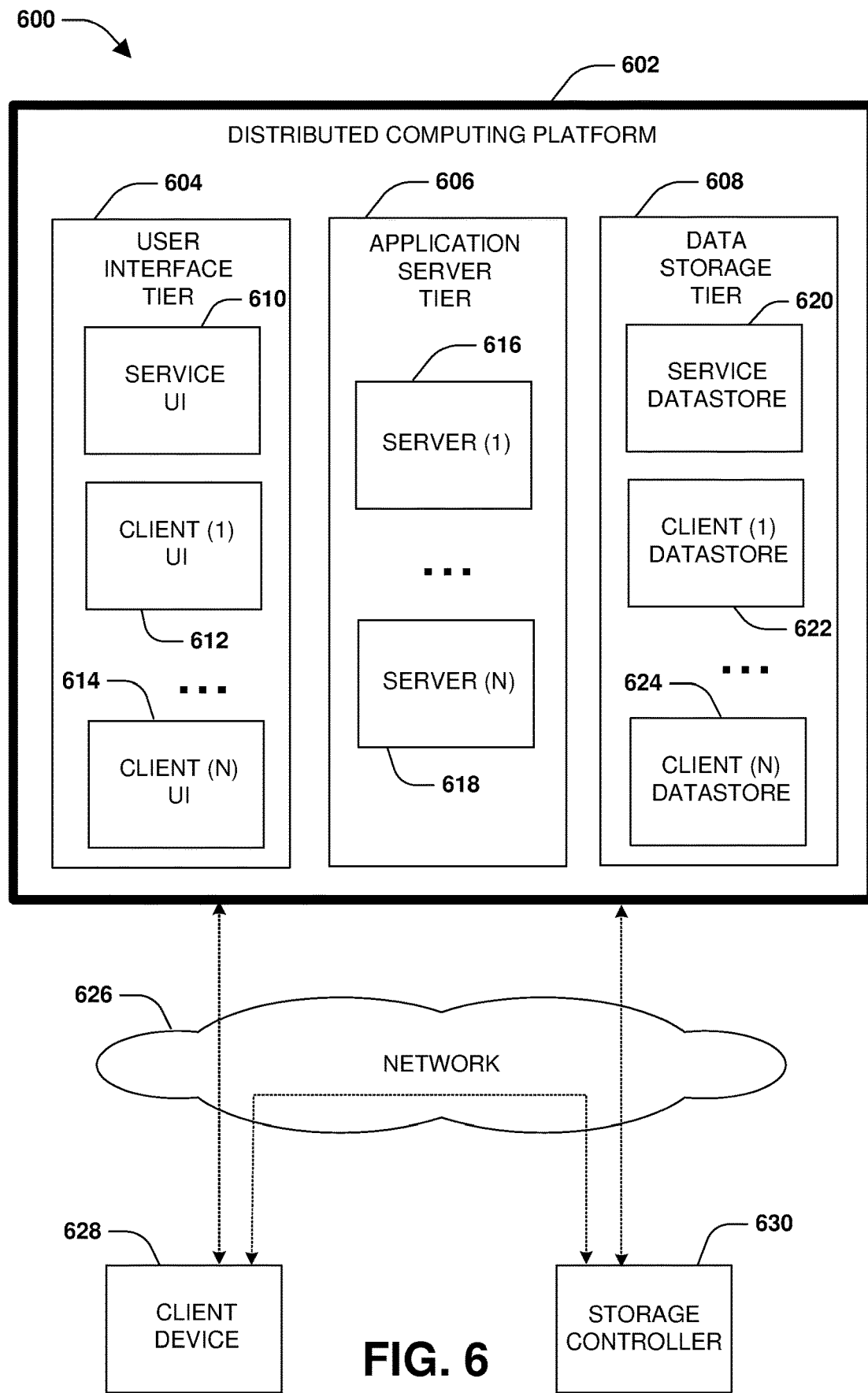
FIG. 6 is a component block diagram illustrating an example computing environment in which an embodiment of the invention may be implemented.

FIG. 6 is a diagram illustrating an example operating environment 600 in which an embodiment of the techniques described herein may be implemented. In one example, the techniques described herein may be implemented within a client device 628, such as a laptop, tablet, personal computer, mobile device, wearable device, etc. In another example, the techniques described herein may be implemented within a storage controller 630, such as a node configured to manage the storage and access to data on behalf of the client device 628 and/or other client devices. In another example, the techniques described herein may be implemented within a distributed computing platform 602 such as a cloud computing environment (e.g., a cloud storage environment, a multi-tenant platform, etc.) configured to manage the storage and access to data on behalf of the client device 628 and/or other client devices.

In yet another example, at least some of the techniques described herein are implemented across one or more of the client device 628, the storage controller 630, and the distributed computing platform 602. For example, the client device 628 may transmit operations, such as data operations to read data and write data and metadata operations (e.g., a create file operation, a rename directory operation, a resize operation, a set attribute operation, etc.), over a network 626 to the storage controller 630 for implementation by the storage controller 630 upon storage. The storage controller 630 may store data associated with the operations within volumes or other data objects/structures hosted within locally attached storage, remote storage hosted by other computing devices accessible over the network 626, storage provided by the distributed computing platform 602, etc. The storage controller 630 may replicate the data and/or the operations to other computing devices so that one or more replicas, such as a destination storage volume that is maintained as a replica of a source storage volume, are maintained. Such replicas can be used for disaster recovery and failover.

The storage controller 630 may store the data or a portion thereof within storage hosted by the distributed computing platform 602 by transmitting the data to the distributed computing platform 602. In one example, the storage controller 630 may locally store frequently accessed data within locally attached storage. Less frequently accessed data may be transmitted to the distributed computing platform 602 for storage within a data storage tier 608. The data storage tier 608 may store data within a service data store 620, and may store client specific data within client data stores assigned to such clients such as a client (1) data store 622 used to store data of a client (1) and a client (N) data store 624 used to store data of a client (N). The data stores may be physical storage devices or may be defined as logical storage, such as a virtual volume, LUNs, or other logical organizations of data that can be defined across one or more physical storage devices. In another example, the storage controller 630 transmits and stores all client data to the distributed computing platform 602. In yet another example, the client device 628 transmits and stores the data directly to the distributed computing platform 602 without the use of the storage controller 630.

The management of storage and access to data can be performed by one or more storage virtual machines (SMVs) or other storage applications that provide software as a service (SaaS) such as storage software services. In one example, an SVM may be hosted within the client device 628, within the storage controller 630, or within the distributed computing platform 602 such as by the application server tier 606. In another example, one or more SVMs may be hosted across one or more of the client device 628, the storage controller 630, and the distributed computing platform 602.

In one example of the distributed computing platform 602, one or more SVMs may be hosted by the application server tier 606. For example, a server (1) 616 is configured to host SVMs used to execute applications such as storage applications that manage the storage of data of the client (1) within the client (1) data store 622. Thus, an SVM executing on the server (1) 616 may receive data and/or operations from the client device 628 and/or the storage controller 630 over the network 626. The SVM executes a storage application to process the operations and/or store the data within the client (1) data store 622. The SVM may transmit a response back to the client device 628 and/or the storage controller 630 over the network 626, such as a success message or an error message. In this way, the application server tier 606 may host SVMs, services, and/or other storage applications using the server (1) 616, the server (N) 618, etc.

A user interface tier 604 of the distributed computing platform 602 may provide the client device 628 and/or the storage controller 630 with access to user interfaces associated with the storage and access of data and/or other services provided by the distributed computing platform 602. In an example, a service user interface 610 may be accessible from the distributed computing platform 602 for accessing services subscribed to by clients and/or storage controllers, such as data replication services, application hosting services, data security services, human resource services, warehouse tracking services, accounting services, etc. For example, client user interfaces may be provided to corresponding clients, such as a client (1) user interface 612, a client (N) user interface 614, etc. The client (1) can access various services and resources subscribed to by the client (1) through the client (1) user interface 612, such as access to a web service, a development environment, a human resource application, a warehouse tracking application, and/or other services and resources provided by the application server tier 606, which may use data stored within the data storage tier 608.

The client device 628 and/or the storage controller 630 may subscribe to certain types and amounts of services and resources provided by the distributed computing platform 602. For example, the client device 628 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the storage controller 630 can establish a subscription to have access to certain services and resources of the distributed computing platform 602.

As shown, a variety of clients, such as the client device 628 and the storage controller 630, incorporating and/or incorporated into a variety of computing devices may communicate with the distributed computing platform 602 through one or more networks, such as the network 626. For example, a client may incorporate and/or be incorporated into a client application (e.g., software) implemented at least in part by one or more of the computing devices.

Examples of suitable computing devices include personal computers, server computers, desktop computers, nodes, storage servers, storage controllers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 602, such as a multi-tenant business data processing platform or cloud computing environment, may include multiple processing tiers, including the user interface tier 604, the application server tier 606, and a data storage tier 608. The user interface tier 604 may maintain multiple user interfaces, including graphical user interfaces and/or web-based interfaces. The user interfaces may include the service user interface 610 for a service to provide access to applications and data for a client (e.g., a "tenant") of the service, as well as one or more user interfaces that have been specialized/customized in accordance with user specific requirements, which may be accessed via one or more APIs.

The service user interface 610 may include components enabling a tenant to administer the tenant's participation in the functions and capabilities provided by the distributed computing platform 602, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 608 may include one or more data stores, which may include the service data store 620 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 602 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

In an embodiment, the described methods and/or their equivalents may be implemented with computer executable instructions. Thus, In an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM) s, CD-Rs, compact disk re-writeable (CD-RW) s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
hosting a volume storing shared data that is referenced by a recipient volume and storing data exclusive to the volume and not shared with the recipient volume, wherein data exclusive to the volume is determined by deduplication prior to storage at the volume;
receiving a delete command from a first tenant to delete the volume;
implementing the delete command by:
deleting the data exclusive to the volume
deleting an exclusive encryption key of the volume;
marking the shared data for subsequent deletion; and
marking a shared encryption key of the volume for subsequent deletion; and
executing a scanner to identify and reassign the shared data of the volume to a new donor volume using a reference count structure to identify the shared data.

2. The method of claim 1, wherein the volume is a donor for the shared data of the volume, and wherein the volume is a recipient for data stored by a different volume and referenced by the volume.

3. The method of claim 1, wherein the implementing the delete command comprises:
deleting references within the volume to data stored by a different volume.

4. The method of claim 3, wherein the implementing the delete command comprises:
updating a fingerprint store to reflect that the volume has been deleted and no longer comprises the references.

5. The method of claim 3, wherein the implementing the delete command comprises:
updating a reference count to reflect that the volume has been deleted and no longer comprises the references.

6. The method of claim 1, wherein the implementing the delete command comprises:
updating a fingerprint store to reflect that the volume has been deleted and no longer comprises the data exclusive to the volume.

7. The method of claim 1, wherein the implementing the delete command comprises:
updating a reference count to reflect that the volume has been deleted and no longer comprises the data exclusive to the volume.

8. A non-transitory machine readable medium comprising instructions, which when executed by a machine, causes the machine to:
host a volume storing shared data that is referenced by a recipient volume and storing data exclusive to the volume and not shared with the recipient volume, wherein data exclusive to the volume is determined by deduplication prior to storage at the volume;
receive a delete command from a first tenant to delete the volume;
implement the delete command by:
deleting the data exclusive to the volume
deleting an exclusive encryption key of the volume;
marking the shared data for subsequent deletion; and
marking a shared encryption key of the volume for subsequent deletion; and
execute a scanner to identify and reassign the shared data of the volume to a new donor volume using a reference count structure to identify the shared data.

9. The non-transitory machine readable medium of claim 8, wherein the instructions cause the machine to:
update a fingerprint store to reflect that the new donor volume comprises the shared data and that the shared data is no longer stored within the volume.

10. The non-transitory machine readable medium of claim 8, wherein the instructions cause the machine to:
utilize, by the scanner, the reference count structure to identify the shared data based upon data block identifiers having reference counts greater than 1 indicating that at least one other volume references data blocks identified by the data block identifiers.

11. The non-transitory machine readable medium of claim 8, wherein the instructions cause the machine to:
decrypt, by the scanner, the shared data within the volume using the shared encryption key as decrypted shared data.

12. The non-transitory machine readable medium of claim 11, wherein the instructions cause the machine to:
re-encrypt, by the scanner, the decrypted shared data using a different shared encryption key of the new donor volume.

13. The non-transitory machine readable medium of claim 12, wherein the instructions cause the machine to:
in response to re-encrypted the decrypted shared data using the different shared encryption key, delete the shared encrypted key.

14. A computing device comprising:
a memory comprising machine executable code; and
a processor coupled to the memory, the processor configured to execute the machine executable code to cause the processor to:
host a volume storing shared data that is referenced by a recipient volume and storing data exclusive to the volume and not shared with the recipient volume, wherein data exclusive to the volume is determined by deduplication prior to storage at the volume;
receive a delete command from a first tenant to delete the volume;
implement the delete command by:
deleting the data exclusive to the volume
deleting an exclusive encryption key of the volume;
marking the shared data for subsequent deletion; and
marking a shared encryption key of the volume for subsequent deletion; and
execute a scanner to identify and reassign the shared data of the volume to a new donor volume using a reference count structure to identify the shared data.

15. The computing device of claim 14, wherein the machine executable code causes the processor to:
update a fingerprint store to reflect that the new donor volume comprises the shared data and that the shared data is no longer stored within the volume.

16. The computing device of claim 14, wherein the machine executable code causes the processor to:
update the reference count structure to reflect that the new donor volume comprises the shared data and that the shared data is no longer stored within the volume.

17. The computing device of claim 14, wherein the scanner is executed as a background process having lower execution priority than storage services of a storage environment hosting the volume.

18. The computing device of claim 14, wherein the volume is a donor for the shared data of the volume, and wherein the volume is a recipient for data stored by a different volume and referenced by the volume.

19. The computing device of claim 14, wherein the machine executable code causes the processor to:
  decrypt, by the scanner, the shared data within the volume using the shared encryption key as decrypted shared data.

20. The computing device of claim 19, wherein the machine executable code causes the processor to:
  re-encrypt, by the scanner, the decrypted shared data using a different shared encryption key of the new donor volume.

* * * * *